Patented Dec. 28, 1937

2,103,657

UNITED STATES PATENT OFFICE 2,103,657

ORGANIC MERCURY COMPOUNDS

Carl N. Andersen, Wellesley Hills, Mass., assignor to Lever Brothers Company, a corporation of Maine No Drawing. Application October 16, 1935, Serial No. 45,320

20 Claims. (Cl. 260—13)

The present invention relates to the production of certain new organic mercury compounds, and more particularly to aromatic mercury salts of halogen substituted aromatic acids.

It is an object of my invention to produce new organic mercury compounds useful as germicides and for other therapeutic purposes.

I have discovered that when the hydrogen atom of the acidic group or groups of halogen substituted aromatic acids is replaced by the essential radical of certain aromatic mercury compounds, compounds are produced which have extraordinarily high potency as antiseptics and germicides, and at the same time are characterized by relatively low toxicity and other desirable properties.

The compound I have produced may be described as having the general formula $(RHg)_x.R_1$, in which R represents an aromatic structure to a carbon atom of which the mercury is directly attached; in which $x$ represents the number of RHg groups in a compound which may be one or more; and in which $R_1$ represents a halogen substituted aromatic acid radical that is linked to the RHg group, or groups, through the replacement of the hydrogen atom of the acidic group or groups. While the words "group" and "groups" are used hereinafter, it is obvious that both words must be interpreted as singular or plural depending on whether the compound contains one or more RHg groups.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as, for example, polycyclic hydrocarbons in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents a radical corresponding to an aromatic compound which contains one or more acidic groups, and in which one or more of the hydrogens attached to nuclear carbon atoms have been substituted by a halogen. The aromatic compound may be mono- or poly-nuclear and it may have one or more acid groups. If the compound is poly-nuclear the acid groups may be attached to the same or different aromatic rings. The compound may have any acid radical such as the carboxyl, sulfonic, etc. Any of the halogens may be substituted and more than one may be substituted in a compound. More than one of the hydrogens of the ring may be replaced by one or more of the halogens and some other atom or group, for example, any monovalent radical.

The following examples illustrate the types of acids and acid derivatives falling within the above defined class, and from which organic mercury salts of the type heretofore defined may be prepared:

Ortho-chloro benzoic acid,
Ortho-iodo benzoic acid,
3-chlor and 5-chlor salicylic acids,
1-chloro 2-carboxy anthraquinone,
1-chloro 2-carboxy naphthoic acid,
Tetrachlor phthalic acid,
3-5-di-odo-4-hydroxy benzoic acid,
Tetrabrom phthalic anhydride,
Eosene Y, "Schultz" No. 881, (7th edition) "Colour Index" 768,
Phloxine, "Schultz" No. 888, "Colour Index" 774.

The last two compounds are dyes which fall within the above defined class, and which I have found suitable for preparing high aromatic mercury compounds.

In the case of the anhydride and other acid derivatives, the reaction is slightly different, as will be pointed out in more detail hereinafter.

The compounds I have prepared, together with others I have investigated, comprise a sufficiently representative number of the halogen substituted aromatic acids to lead me to believe that all of the acids of this general group may be employed to produce my novel mercury compounds. The compounds so prepared have in greater or lesser degree, but always in a relatively high degree, antiseptic and germicide properties. I, therefore, regard my invention generic to and including the entire group of halogen substituted aromatic acids of the above defined type.

The general method of producing these compounds consists in reacting together a halogen substituted aromatic acid and a compound containing an aromatic mercury radical of the above defined type. A common solvent for both reacting components is employed. The compound resulting from the reaction is usually relatively insoluble as compared with the reacting components, and upon its precipitation may be filtered, washed and dried. In my application Serial No.

694,198, filed October 18, 1933, I have disclosed a general method of preparing aromatic mercury compounds of this type by reacting the acidic compound with an aromatic mercury hydroxide. This reaction is one of neutralization of an acid and a base to form a salt and water. This has the advantage that water is the only other product produced and the resulting compound may be easily purified. In my application Serial No. 694,199, filed October 18, 1933, I have disclosed another general method of preparing aromatic mercury compounds of this type by employing a soluble aromatic mercury salt, for example, the acetate or the lactate, in a reaction with the acidic compound. The aromatic mercury compounds produced are of a relatively low solubility as compared with the aromatic mercury salts and are relatively insoluble as compared with the acidic compound. In my application Serial No. 50,001 filed November 15, 1935, I have disclosed a method of preparing aromatic mercury compounds by reacting an acid derivative, such as an ester or anhydride with an aromatic mercury hydroxide to form the corresponding aromatic mercury salt. Any of these general methods may be employed in producing compounds comprising this invention. In these methods the substituted halogens do not enter into the reaction, and the structure of the compound remains the same except for the replacement of the acidic hydrogen, or hydrogens, by the aromatic mercury group or groups.

The following examples are given as illustrative of a method by which all of the compounds comprising this invention may be prepared and as illustrative of representative organic mercury derivatives falling within the scope of my invention:

Example 1

17.64 grams of phenylmercury hydroxide is dissolved in 2 liters of water and heated until solution is complete. The solution is filtered to remove any gum or insoluble material. To the filtrate is added 15 grams of ortho-iodo-benzoic acid, dissolved in 50 cc. of alcohol. A white precipitate results, and the mixture is allowed to stand and cool, after which the precipitate is separated by filtration, washed well with warm water and alcohol, and dried. It has a melting point of 176° C. and is the compound phenylmercury ortho-iodo-benzoate.

Example 2

17.64 grams of phenylmercury hydroxide is dissolved in 500 cc. of water and heated until solution is complete. The solution is filtered to remove any gum or insoluble material. To the filtrate is added 23.38 grams of 3,5-di-odo-4-hydroxy benzoic acid dissolved in 500 cc. of alcohol. The addition of this solution causes a heavy white precipitate. The mixture is allowed to cool and is filtered. The precipitate is washed well with hot water and then recrystallized from alcohol. It decomposes at 211.5° C. and is the compound phenylmercury 3,5-di-odo-4-hydroxy benzoate.

Example 3

35.28 grams of phenylmercury hydroxide is dissolved in 1 liter of water and heated until solution is complete. The solution is filtered to remove any gum or insoluble material. To the filtrate is added 18.24 grams of tetrachlor phthalic acid dissolved in 500 cc. of alcohol. A voluminous white precipitate results at once and the mixture is allowed to cool, and is then filtered. The precipitate is washed well with water and recrystallized from alcohol. Upon heating it partially volatilizes at 234.5° C.; no further change occurs up to 266° C. It is the compound diphenylmercury tetrachlor phthalate.

Example 4

35.28 grams of phenylmercury hydroxide is dissolved in 1 liter of water and heated until solution is complete. The solution is filtered to remove any gum or insoluble material. To the filtrate is added 27.84 grams of tetrabrom phthalic anhydride dissolved in 500 cc. of alcohol. The anhydride is difficultly soluble in water, and requires heating in order to form a solution. Upon the mixing of the two solutions a heavy white voluminous precipitate results. The mixture is allowed to cool and is then filtered. The precipitate is washed with hot water and then with hot alcohol. It is then recrystallized from alcohol. Upon heating, it partially volatilizes at 180.1° C.; the residue sinters at 198.1° C. It is the compound diphenylmercury tetrabrom phthalate.

Example 5

17.64 grams of phenylmercury hydroxide is dissolved in 500 cc. of water and heated until solution is complete. The solution is filtered to remove any insoluble material. To the filtrate is added an alcoholic solution of 17.28 grams of 1-chloro, 2-carboxy anthraquinone. A light yellow precipitate results which is separated by filtration, washed and dried. Upon twice recrystallizing it from alcohol, the material decomposes at 202.2° to 205.3° C. It is the phenylmercury salt of 1-chloro, 2-carboxy anthraquinone.

Example 6

17.64 grams of phenylmercury hydroxide is dissolved in one liter of water and heated until solution is complete. The solution is filtered to remove any gum or insoluble material. To the filtrate is added 13.21 grams of 1-chloro, 2-carboxy naphthoic acid dissolved in 250 cc. of alcohol. A white precipitate results. The mixture is agitated thoroughly and allowed to stand after which it is filtered. The precipitate is washed with water and alcohol. It is then recrystallized from alcohol. It is a white solid insoluble in water and decomposes at 227.2° C. It is the compound phenylmercury 1-chloro, 2-carboxy naphthoate.

The reacting materials are employed in substantially theoretical quantities. In some cases, if desired, approximately 10% excess of the acid or acid derivative may be employed in order to insure a complete conversion of the phenylmercury compound.

Any suitable solvent in which the reacting components are soluble may be used as the medium for carrying out the reaction. If they are both soluble in water this is generally used for reasons of convenience, but if not, other solvents such as the alcohols or acetone or mixtures of these with each other or with water, may be employed.

The process may be carried out at any temperature, for example, room temperature. In most cases I find, however, that the use of heat facilitates the solution of the reaction components and speeds the reaction.

From the description of the specific examples, it will be readily apparent to one skilled in the art how other members of the above identified group may be reacted with an aromatic mercury compound to produce the other mercury compounds of analogous structure which are within the scope of my invention.

The compounds produced as above described are characterized by extraordinarily high potency as antiseptics and germicides. Tests to determine the efficacy of some of them in killing B. typhosus and Staph. aureus were carried out under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against Eberthella typhi (typhoid bacillus) at 37° C. and F. D. A. special method against Staph. aureus at 37° C.

As illustrative of the potency of the compounds, the killing power of the following compounds is given merely for illustration.

The figures represent the maximum dilutions at which killing in 15 minutes resulted:

|  | Staph. aureus |
|---|---|
| Phenylmercury ortho-chloro benzoate | 1:35,000 |
| Phenylmercury iodo benzoate | 1:30,000 |

|  | B. typhosus | Staph. aureus |
|---|---|---|
| Phenylmercury derivative of phloxine | 1:90,000 | 1:20,000 |

In addition to their high germicidal value, all of these compounds are characterized by relatively low toxicity. Because of these properties it is possible to use them in extreme dilutions and in many situations where known germicides, because of toxic or other undesirable properties, cannot be employed. They may be used externally and locally on human beings and higher animals and in some cases administered internally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a halogen nuclear substituted aromatic acid radical which is linked to the RHg group through the replacement of an acidic hydrogen atom and in which $x$ represents the number of RHg groups in the compound and is an integer representing the number of acidic hydrogen atoms in the acid.

2. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a halogen nuclear substituted mononuclear aromatic acid radical which is linked to the RHg group through the replacement of an acidic hydrogen atom and in which $x$ represents the number of RHg groups in the compound and is an integer representing the number of acidic hydrogen atoms in the acid.

3. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a monohalogen nuclear substituted mononuclear aromatic acid radical which is linked to the RHg group through the replacement of an acidic hydrogen atom and in which $x$ represents the number of RHg groups in the compound and is an integer representing the number of acidic hydrogen atoms in the acid.

4. A new organic mercury compound having the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents a monohalogen nuclear substituted mononuclear aromatic monobasic acid radical which is linked to the RHg group through the replacement of the acidic hydrogen atom.

5. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a polyhalogen nuclear substituted mononuclear aromatic acid radical which is linked to the RHg group through the replacement of an acidic hydrogen atom and in which $x$ represents the number of RHg groups in the compound and is an integer representing the number of acidic hydrogen atoms in the acid.

6. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a polyhalogen nuclear substituted mononuclear aromatic polybasic acid radical which is linked to the RHg groups through the replacement of the acidic hydrogen atoms and in which $x$ represents the number of RHg groups in the compound and is an integer representing the number of acidic hydrogen atoms in the acid.

7. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a halogen nuclear substituted polynuclear aromatic acid radical which is linked to the RHg group through the replacement of an acidic hydrogen atom and in which $x$ represents the number of RHg groups in the compound and is an integer representing the number of acidic hydrogen atoms in the acid.

8. A new organic mercury compound having the general formula $(RHg)_x.R_1$, in which R represents an aromatic structure to a carbon atom of which the mercury is directly attached, and in which none of the carbon atoms has direct linkage with any element other than hydrogen, carbon and mercury; in which $R_1$ represents a monohalogen nuclear substituted aromatic acid radical which is linked to the RHg group through the replacement of an acidic hydrogen atom and in which $x$ represents the number of RHg groups in the compound and is an integer representing the number of acidic hydrogen atoms in the acid.

9. A new organic mercury compound having the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents a monohalogen nuclear substituted polynuclear aromatic monobasic acid radical which is linked to the RHg group through the replacement of the acidic hydrogen atom.

10. A new organic mercury compound having the general formula $(C_6H_5Hg)_x.R_1$, in which $R_1$ represents a halogen nuclear substituted aromatic acid radical which is linked to the $C_6H_5Hg$ group through the replacement of an acidic hydrogen atom and in which $x$ represents the number of $C_6H_5Hg$ groups in the compound and is an integer representing the number of acidic hydrogens in the acid.

11. A new organic mercury compound having the general formula $(C_6H_5Hg)_x.R_1$, in which $R_1$ represents a halogen nuclear substituted mononuclear aromatic acid radical which is linked to the $C_6H_5Hg$ group through the replacement of an acidic hydrogen atom and in which $x$ represents the number of $C_6H_5Hg$ groups in the compound and is an integer representing the number of acidic hydrogens in the acid.

12. A new organic mercury compound having the general formula $C_6H_5Hg.R_1$, in which $R_1$ represents a monohalogen nuclear substituted mononuclear aromatic monobasic acid radical which is linked to the $C_6H_5Hg$ group through the replacement of the acidic hydrogen atom.

13. A new organic mercury compound having the general formula $(C_6H_5Hg)_x.R_1$, in which $R_1$ represents a polyhalogen nuclear substituted mononuclear aromatic acid radical which is linked to the $C_6H_5Hg$ group through the replacement of an acidic hydrogen atom and in which $x$ represents the number of $C_6H_5Hg$ groups in the compound and is an integer representing the number of acidic hydrogens in the acid.

14. A new organic mercury compound having the general formula $(C_6H_5Hg)_x.R_1$, in which $R_1$ represents a polyhalogen nuclear substituted mononuclear aromatic polybasic acid radical which is linked to the $C_6H_5Hg$ groups through the replacement of the acidic hydrogen atoms and in which $x$ represents the number of $C_6H_5Hg$ groups in the compound and is an integer representing the number of acidic hydrogens in the acid.

15. A new organic mercury compound having the general formula $(C_6H_5Hg)_x.R_1$, in which $R_1$ represents a halogen nuclear substituted polynuclear aromatic acid radical which is linked to the $C_6H_5Hg$ group through the replacement of an acidic hydrogen atom and in which $x$ represents the number of $C_6H_5Hg$ groups in the compound and is an integer representing the number of acidic hydrogens in the acid.

16. A new organic mercury compound having the general formula $(C_6H_5Hg)_x.R_1$, in which $R_1$ represents a monohalogen nuclear substituted aromatic acid radical which is linked to the $C_6H_5Hg$ group through the replacement of an acidic hydrogen atom and in which $x$ represents the number of $C_6H_5Hg$ groups in the compound and is an integer representing the number of acidic hydrogens in the acid.

17. A new organic mercury compound having the general formula $C_6H_5Hg.R_1$, in which $R_1$ represents a monohalogen nuclear substituted polynuclear aromatic monobasic acid radical which is linked to the $C_6H_5Hg$ group through the replacement of the acidic hydrogen atom.

18. Phenylmercury tetrachlor phthalate.

19. Phenylmercury ortho-chloro benzoate.

20. Phenylmercury 1-chloro 2-carboxy naphthoate.

CARL N. ANDERSEN.